Figure 1:
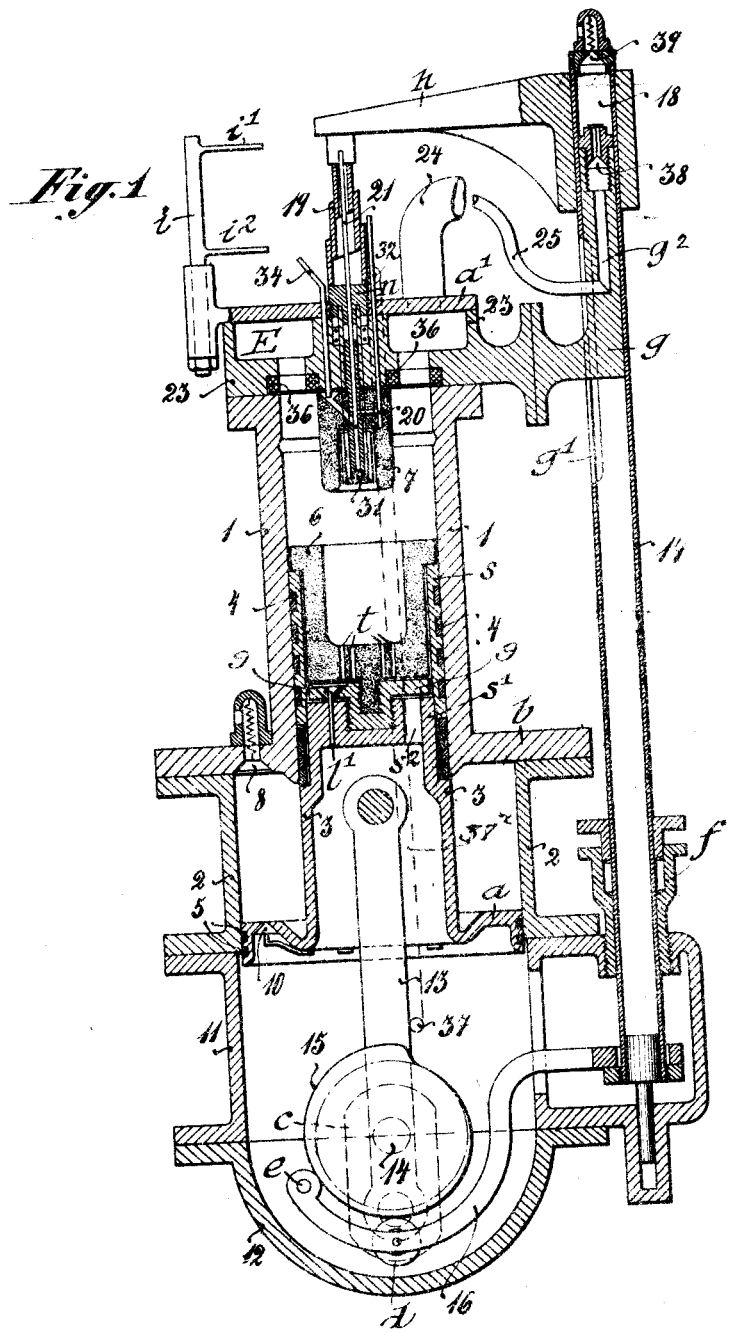

H. HADWIGER.
INTERNAL COMBUSTION ENGINE.
APPLICATION FILED JAN. 21, 1902. RENEWED OCT. 25, 1906.

1,106,940.

Patented Aug. 11, 1914.
3 SHEETS—SHEET 1.

WITNESSES:

INVENTOR
Hugo Hadwiger
By Gospel & Niles
ATTORNEYS.

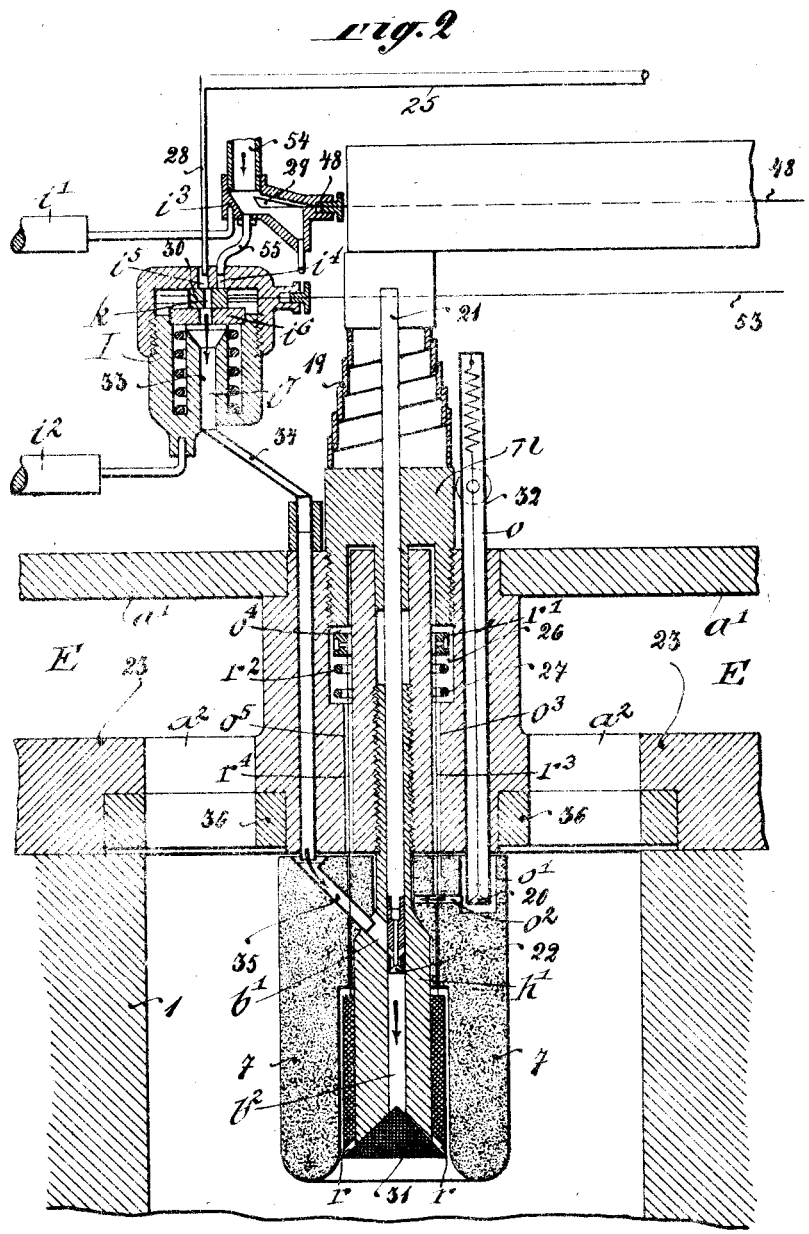

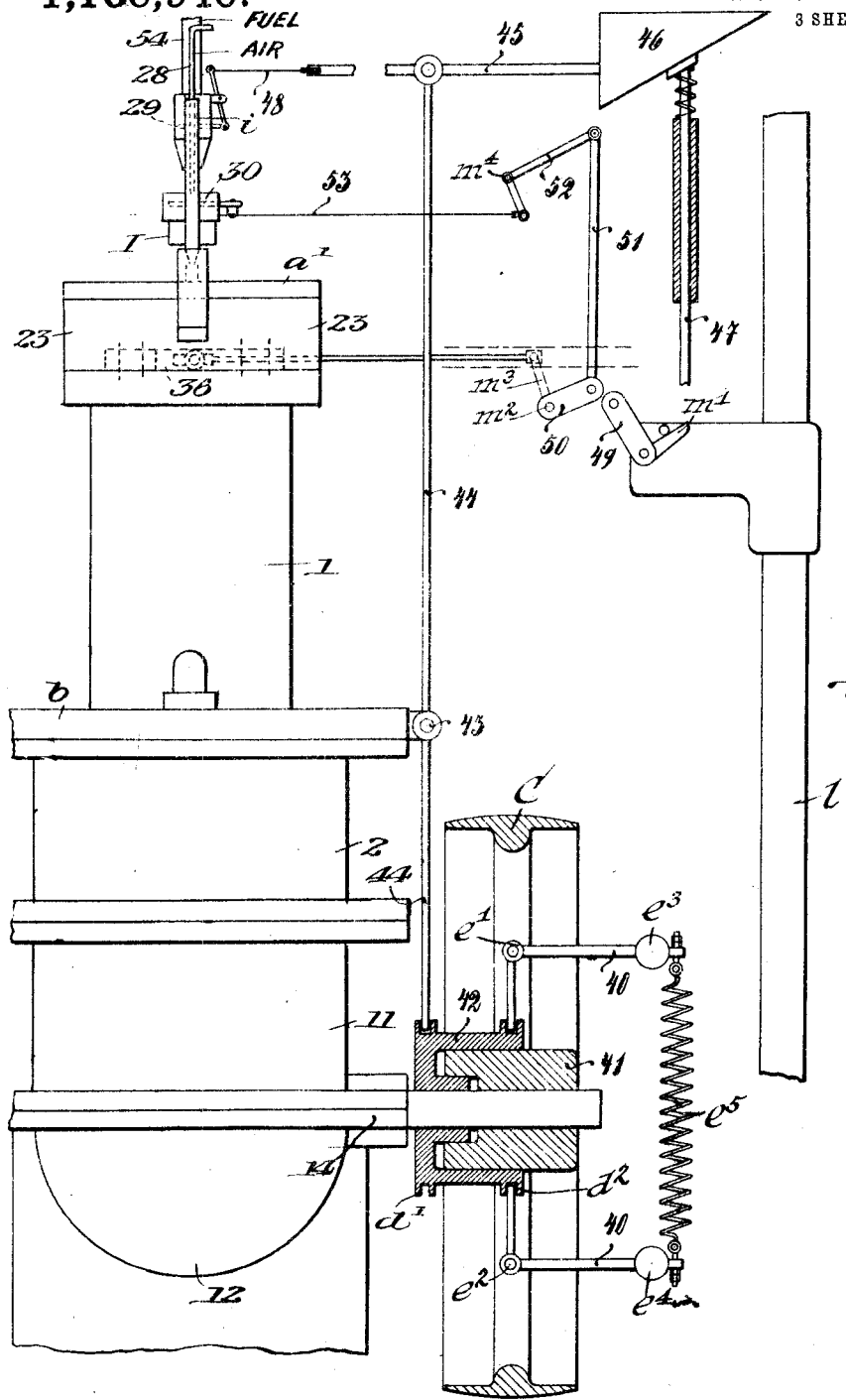

UNITED STATES PATENT OFFICE.

HUGO HADWIGER, OF VIENNA, AUSTRIA-HUNGARY.

INTERNAL-COMBUSTION ENGINE.

1,106,940.   Specification of Letters Patent.   Patented Aug. 11, 1914.

Application filed January 21, 1902, Serial No. 90,722. Renewed October 25, 1906. Serial No. 340,596.

*To all whom it may concern:*

Be it known that I, HUGO HADWIGER, a citizen of the Empire of Austria-Hungary, residing in Vienna, in said Empire of Austria-Hungary, have invented certain new and useful Improvements in Internal-Combustion Engines, of which the following is a specification.

The gas-engines, caloric-motors, etc., heretofore in use gave at the highest only from 20 to 28% of the theoretical mechanical effect of the fuel consumed. The reason for this low degree of efficiency lay chiefly in the fact that the cylinder-walls, cylinder-head, piston valves, etc., became highly heated, and cooling was rendered necessary, the latter absorbing some 40% of the useful heat. A further diminution of the mechanical effect was caused, especially in explosion-motors, by the fact that the maximum expansion of the working gas was necessarily limited so that the fall of pressure was small and the exhaust was still of high temperature. Furthermore, incomplete combustion of the fuel, especially when the same was too heavily gas-charged, operated to reduce the mechanical effect. By the present invention these various evils are in part entirely overcome and in part essentially diminished.

The non-advantageous modes of cooling necessary in former motors are avoided by the present invention, the cooling of the parts being effected by a non-heated working gas, (air) and said parts being separated from the heated gas, either by means of walls which for the purpose are formed of fireproof material, or by means of the admission of the non-heated working gas into the explosion-chamber in a special manner. As air is a poor conductor of heat, and only a few and very small connected conducting parts are provided, the amount of heat absorbed by the parts of the motor from the hot gases is reduced to almost zero, and there remains only a small loss of heat by direct radiation, which can be reduced as desired by thickening the walls of the motor. The lessening of the thermal loss is accompanied by an increase of the mechanical efficiency, which latter receives still further addition through the complete combustion of the fuel. This complete combustion is reached according to this invention by the arrangement of a special characteristic admission-construction for the fuel by means of which the same is admitted either at the moment of highest compression or, for avoiding shocks, an instant before the same, in explosive condition and at high but regular speed, into the explosion-chamber. The explosion itself follows in the chamber through the instantaneous heating and compression. Premature ignition is thereby prevented and the maximum expansion can go to any desired height. Through these means of admission and ignition a complete burning of all the fine particles of the combined mixture is effected and as a large (nearly 20 times) excess of air is present, the explosion takes place in the midst of an air-mass without directly reaching the walls of the neighboring parts, so that injurious shocks are avoided. As thereafter a blast of fresh air in excess is blown through the parts, obstruction of the slides and valves is prevented. By these means are overcome the two chief reasons which until now have hindered the direct use of a stable combustible for the driving of internal combustion motors.

In the accompanying drawings, Figure 1 is a vertical central section through a motor constructed according to my invention, with parts omitted, Fig. 2 is a vertical central section, on a larger scale, through a portion of the combustion-chamber and adjacent parts, and showing the mechanism for supplying the fuel, Fig. 3 illustrates the mechanism for operating the supply and exhaust-valves of the motor.

Similar characters of reference indicate corresponding parts.

Referring to the drawings, 1 indicates the cylinder of the motor and 3 the piston of the same, which form together the combustion-chamber in which the successive explosions take place. The piston is provided with suitable packing-rings 4, and at its upper or inner end is provided with a deep recess or cavity in which is seated a heat insulating part consisting of a cup-shaped lining 6 made of any strong fireproof material and the cavity of which has slightly larger dimensions than the coöperating heat-insulating part consisting of a plunger 7 formed of similar material and located on the opposite end or head 23 of the cylinder, in position to enter the lining or cup 6 when the piston moves inwardly. Connected with the cylinder 1 is a housing 2, 11, 12, of greater width than the cylinder; and in the 2 the piston is also guided by means of a flange or auxiliary piston $a$ provided with suitable packing 5. The flange $b$ of the cylinder by which the same is connected with the portion 2 of the housing, is provided with an opening normally closed by an inwardly-opening spring-pressed valve 8, and the flange $a$ is provided with an opening normally closed by a spring-pressed valve 10 serving for admitting air into the housing 2, 11, 12, said valves being arranged respectively to permit entrance of air and to prevent exit, so that the parts thereby form an air-pump, adapted, upon reciprocation of the piston, to force air into the housing below the piston-flange $a$. The piston is connected by a connecting-rod 13 and a crank $c$ with a main-shaft 14, upon which is fixed a cam 15, engaging at its circumference an antifriction-roller $d$ attached to a trip-lever 16, pivoted at one end to the housing at $e$, and loosely engaging at its opposite end with a slide-tube 17, which passes to the exterior of the housing through a suitable stuffing-box $f$ and forms at its upper end the barrel 18 of an air-pump provided with suitable spring-actuated inlet-valves 38 and 39, the latter being mounted on the outer end of the tube and the former on a suitable bracket $g$, entering the tube 17, through a slot $g^1$ of the same, and provided with a bore $g^2$. A flexible tube 25 is connected at one end with said bore, extending through the slot $g^1$, and at its opposite end with a tube 28, (Fig. 2), for supplying air for introducing the fuel into the combustion-chamber. An arm or bracket $h$, connected with the tube 17, extends laterally therefrom and is connected at its outer end with the stem 21 of a fuel-supply valve 22, guided in the head of the cylinder 1 and extending through a suitable core $h^1$ located in a cavity of the plunger 7, said core being screwed at its outer smaller end into the cylinder-head 23 and thereby retaining the plunger in position. A volute spring 19 is interposed between a plug $n$ screwed into a cavity in the head 23, and the arm or bracket $h$, and serves to return the valve 22 to its initial or closed position. Said spring also returns the rod 17 and lever 16 into raised position after depression.

Upon suitable arms $i^1$ $i^2$ of a post $i$ are mounted the feeding-devices for the fuel. The fuel is preferably in the form of a powder and is supplied through a pipe 54 into a suitable chamber $i^3$, from which leads a pipe 55 to a duct $i^4$ in the cover of a valve-chest I. A duct $i^5$ is located adjacent the duct $i^4$, and with the same is connected the air-tube 28. In the valve-chest I is located, between the cover and a suitable perforated spring-pressed plate $i^6$, a valve 30, having a perforation $k$, said valve by reciprocation forming or interrupting communication between the duct $i^5$ and the perforation of the plate $i^6$. The valve-chest I is provided at the opposite side of said plate with a duct $i^7$, which is connected by a tube 34 passing through the head 23 of the cylinder, with a tube 35, located in the upper part of the plunger 7 and delivering the fuel by a suitable branch bore $b^1$ into the bore $b^2$, for the valve-stem 21.

In the fuel-chamber $i^3$ is located a suitable regulating slide 29, adapted to deflect more or less of the incoming material away from the pipe 55. Above the head of the cylinder is arranged a cover $a^1$, which forms with the head an exhaust-chamber E, which is connected with the cylinder by suitable passages $a^2$, controlled by a rotary reciprocating exhaust-valve 36, which is guided in suitable ways in the head 23 and provided with openings that serve to register alternately with or close the openings $a^2$ in the cylinder-head $a^1$ at the proper time. An exhaust-pipe 24, arranged on the cover, communicates with the exhaust-chamber for conducting off the products of combustion.

The inlet-valve 30 for the combustible fuel and the exhaust-valve 36 for the products of combination are operated and governed from the main-shaft 14 of the motor, by means of the construction shown in Fig. 3. C is the fly-wheel secured at its hub 41 to the shaft, and on said hub is loosely mounted a sleeve 42 provided with guideways $d^1$ $d^2$. In the latter are engaged the inner ends of suitable bell-crank levers 40 pivoted, as at $e^1$ $e^2$, to the fly-wheel and carrying at their outer ends suitable weights $e^3$ $e^4$, and connected at their outer ends by a spring $e^5$. A lever 44 is pivoted at 43 to the housing and provided at its upper end with an arm 45, connected at one end by a stiff wire or small rod 48 with the slide 29. At the other end is an inclined head 46, which engages one end of a spring-actuated rod 47, having a notched lower end adapted to engage one arm $m^1$ of a knuckle-lever 49, which is fulcrumed to a bracket $l^1$ on a fixed rod $l$, which bracket engages a second knuckle-lever 50 pivoted at $m^2$ to the housing and connected by one arm $m^3$ with the exhaust-valve 36. The other arm of said knuckle-lever 50 is connected by link 51 with an elbow-lever 52 pivoted at $m^4$ to the housing and connected at its opposite end by a stiff wire or small rod 53 with the valve 30 of the valve-chest I.

From the housing, at a point beyond the diaphragm $a$, for example at the point 37, an exterior tube $37^x$ extends to the point 32, and is there connected with a tube $o$ passing through the head 23 and provided at its lower end, within the plunger 7, with a spring-actuated check-valve 20. From the cavity $o^1$ for said tube a duct $o^2$ extends, and from said duct a second duct $o^3$ extends in upward direction to a cavity $o^4$ closed by the plug $n$. From said cavity $o^4$ extends in downward direction a duct $o^5$ through the head but not into the plunger. The lower end of the bore $b^2$ is closed by a cup-shaped valve 31 surrounding the lower end of the core $h^1$ and adapted to be reciprocated upon the same and provided with a conical bottom closing said bore, and with ducts $r$ for permitting the exit of the fuel. In the cavity $o^4$ is located a ring $r^1$, and below the same a spring $r^2$, which normally retains the same in raised position. Through the ducts $o^3$ $o^5$ extend two stiff wires or small rods $r^3$ $r^4$, which continue through channels in the plunger and are connected at their lower ends with said valve 31. By this connection the spring normally retains the valve in raised closed position.

Fuel having been admitted through the tube 54, the same passes through the tube 55. Reciprocation of the valve 30 brings the opening of the same opposite the duct $i^4$ for an instant; the fuel enters the same; the valve is moved before the duct $i^5$; a blast of compressed air from the pump 18 flows through pipes 25 and 28, and the pulverized fuel is blown thereby through the duct $i^7$, tube 34, tube 35, and conduit $b^1$ into the bore $b^2$, the fuel supply valve 22 being raised. The portion of the bore $b^2$ below the valve-stem already contains some fuel. On the downward stroke of the stem 21 of the valve 22 the valve 31 is forced open and a small quantity of the fuel, equal to that charged in at the top, passes out through the ducts $r$, into the cup shaped member on the piston to be exploded. The particular feature of this invention, however, resides in the operations which take place immediately preceding the introduction of the combustible fuel. The piston is provided with a valve 9 located in the body of the same, below the cup or lining 6, and said valve being guided by its pin $l^1$ in the piston. The piston is formed in two parts $s$ $s^1$, screwed together, the former carrying the lining 6, the other being provided with a duct $s^2$ communicating with the space between the two parts, and said valve 9 also communicating with said space. The cup shaped heat insulating lining 6 is screwed into the part $s$ but does not closely fit the same at the bottom or at the sides, and in the bottom are located ducts $t$, said ducts being arranged preferably at the sides of the lining and not directly in the center of the same. Assuming an explosion to have taken place in the combustion-chamber, the piston is forced forward by the excess of pressure behind it, whereby the air in front, contained within the casing is compressed. As soon as the fall of pressure in the cylinder is exceeded by the pressure of the compressed air said compressed air passes through the duct $s^2$, valve 9 and ducts $t$, and also passes through tubes 37 and O, valve 20 and duct $O^1$ into the cylinder, the plunger 7 not being screwed up tightly against the cylinder-head but removed a short distance therefrom, as shown in Fig. 2. The compressed air also passes through ducts $o^2$, $o^3$, $o^4$, and $o^5$ between the plunger 7 and cylinder-head 23, thereby cooling the plunger thoroughly at its base. The spring is also prevented from becoming heated, which would be injurious to the same. The exhaust-valve 36 is now opened and the air sweeps in a blast through the courses described, and carries out into the exhaust-chamber E all particles of unburnt or partially-burnt matter remaining in the combustion-chamber, the same escaping through the pipe 24 and said chamber being filled with pure air. The expansion of the compressed air at the points where it enters the combustion-chamber cools the air so that the same absorbs from the adjacent surfaces of the lining 6 and plunger 7 a large proportion of the heat, and the air itself thus becomes partially heated, which heat is useful as preparing the air for a still greater heating preparatory to the next explosion. Upon the return-stroke the plunger enters the cup-shaped lining 6. The exhaust-valve has been closed and the increased pressure within the combustion-chamber closes the valves 9 and 20. While there is a difference in size between the cavity and the plunger, it is so small nevertheless that the air has not sufficient time to escape, but that portion of the same between the lower end of the plunger and the bottom of the piston is caught and compressed to a high degree. At the moment of highest compression, which is at the extreme inward portion of the stroke, or immediately before the same, the heat is so intense as a result of this compression as to ignite the fuel which is at that moment projected in the midst of the body of compressed air in the manner before described. The explosion then takes place, but owing to the thin layer of air which exists between the side-walls of the plunger and those of the cup-shaped lining, and which air has not been subjected to so great compression, is comparatively long and is in comparison not substantially heated, the heat of the compression is not conducted to any marked extent to the walls of the cylinder 1 but is taken up by the said air and the fireproof lining and plunger. The quantity of air originally in the combustion-chamber is largely in excess, (approximately 20 times, as before stated) of that necessary for the combustion, and upon the forward movement of the piston this large excess again expands into its normal condition and approximately its previous location, the expansion having taken place in the midst of a small body in a highly compressed condition.

Upon each forward stroke of the motor, air is drawn in through the valve 8, and upon each return-stroke said air drawn in is passed through the valve 10 into the space forward of the auxiliary piston $a$ where it is compressed on the next forward stroke and is thereafter forced in the manner described, as a working gas, in compressed condition, into the combustion-chamber. The compression of the clean air in the combustion-chamber prior to the explosion is ordinarily not less than 10 atmospheres. By proper arrangement and operation of the valves, tensions of as high degree as necessary, even to 100 atmospheres, may be obtained. As the ignition is effected instantaneously by heating and compression, premature ignition or failure of the same is prevented and the combustion of the fuel is complete.

Having thus described my invention, I claim as new and desire to secure by Letters Patent:

1. In an internal-combustion engine, the combination, with a cylinder and a piston reciprocating therein, of a stationary heat-insulating plunger on the head of the cylinder, a cup-shaped heat-insulating lining in said piston, means for introducing a combustible fuel through the plunger into the space between the same and the piston-lining, means for forcing compressed air into the cylinder and through and around the heat-insulating parts for cooling the same, and means for permitting the exhausting of the heated products of combustion into the atmosphere.

2. In an internal-combustion engine, the combination of a cylinder, a stationary heat-insulating plunger on the cylinder-head, a piston reciprocated in the cylinder, a cup-shaped heat-insulating lining in said piston, said plunger and piston-lining being provided with air-passages through and around the same, means for supplying a combustible fuel through the plunger into the space between it and the piston-lining, means for introducing compressed air into the cylinder and through and around the heat-insulating members for cooling the same, and means for exhausting the heated products of combustion into the atmosphere.

3. In an internal-combustion engine, the combination, with a cylinder and a piston reciprocated therein, of a closed casing below the cylinder and piston, a heat-insulating plunger on the cylinder-head, a cup-shaped heat-insulating lining on said piston, air-passages in the plunger and piston-lining, means for supplying a combustible fuel through the plunger into the space between the same and the piston-lining, means for compressing air in the space below the cylinder and piston, means for supplying compressed air into the cylinder and to and around said heat-insulating parts for cooling the same, and means for permitting the exhaust of the heated products of combustion into the atmosphere.

4. In an internal-combustion engine, the combination, with a cylinder and a piston reciprocated therein, of a stationary heat-insulating plunger on the cylinder-head, a cup-shaped heat-insulating lining on the piston, means for supplying a combustible fuel, an air-pump for forcing said fuel through the plunger into the combustion-space between the heat-insulating plunger and piston-lining, means for compressing air, means for conducting the compressed air through and around the heat-insulating members into the cylinder for cooling and protecting the same, and means for exhausting the heated products of combustion into the atmosphere.

5. In an internal combustion-engine, the combination, with a cylinder and a piston reciprocated therein, of a cup-shaped heat-insulating lining applied to said piston at the inner face thereof, a stationary heat-insulating plunger mounted on the cylinder-head and adapted to fit into said cup-shaped member, said plunger having an interior valved bore, a fuel-feeding device connected with the bore of the plunger, an air-pump for feeding the fuel through the valve-bore into the space between the plunger and piston-lining, means for compressing air, and means for forcing the compressed air into the cylinder and to and around the heat-insulating members for cooling the same.

6. In an internal-combustion engine, the combination, with a cylinder and a piston reciprocated therein, of a cup-shaped heat-insulating lining applied to said piston at the inner surface thereof, said lining being separated from said piston by spaces affording a circulation of air, a stationary heat-insulating plunger on the cylinder-head cooperating with the insulating lining on said piston in compressing and igniting the air and fuel charge, said plunger being likewise separated from its adjacent parts by small spaces or interstices, a fuel-feeding device connected with the plunger, a separate air-pump for forcing the fuel into the space between the heat-insulating members, means for compressing air, means for conducting the compressed air into the cylinder and through the spaces between the piston and its lining and between the plunger and cylinder-head for cooling the heat-insulating members.

7. In an internal-combustion engine, the combination, with a cylinder and a piston reciprocating therein, of a valve in said piston, an insulating lining applied to said piston but separated therefrom by spaces communicating with said valve, air-passages in said insulating lining, a plunger carried on the cylinder-head and coöperating with said lining to compress and ignite the air and fuel charge, air-passages in said plunger, a valved bore in said plunger, means for feeding fuel through said valved bore in said plunger into the combustion-space between the piston-lining and plunger, means for compressing air, and means for conducting the compressed air through the air-passages in the heat-insulating piston-lining and plunger into the cylinder for cooling the interior parts and protecting them against the heated products of combustion.

8. In an internal-combustion engine, the combination, with a cylinder and a piston reciprocated therein, of a plunger on the cylinder-head, a cup-shaped lining on the piston, air-passages in and around the plunger and piston, means for compressing air in the space below the cylinder and piston, a valve in said piston for permitting the passage of compressed air through piston and air-passages into the cylinder, an air-conduit for conducting the compressed air from the compression-space through the air-passages of the plunger into the cylinder for cooling and protecting the heat-insulating parts, an exhaust-chamber above the cylinder-head, an exhaust-valve in the cylinder-head, means for actuating the exhaust-valve from the engine-shaft, and exhaust-passages in the cylinder-head for exhausting the heated products of combustion.

9. In an internal-combustion engine, the combination, with a cylinder and a piston reciprocated therein, of a stationary heat-insulating plunger on the cylinder-head, a cup-shaped heat-insulating lining on said piston, means for supplying a combustible fuel through the plunger into the space between said heat-insulating members, a closed housing below the cylinder and piston, means for compressing air in said housing, and means for conducting the compressed air around and through the heat-insulating members into the cylinder for cooling the interior parts and expelling the heated products of combustion to the outside of the cylinder.

10. In an internal-combustion engine, the combination, with a cylinder and a piston reciprocating therein, of a closed housing below said cylinder and piston, an exhaust-chamber on the cylinder-head, a stationary plunger on the cylinder-head, a cup-shaped heat-insulating lining on the piston, means for introducing a combustible fuel-charge into the space between the heat-insulating members, means for compressing air in the housing, means for conducting the compressed air from the housing around the heat-insulating plunger and lining into the cylinder for cooling the same, and means for exhausting the products of combustion from the cylinder through the exhaust-chamber into the atmosphere.

11. In an internal-combustion engine, the combination, with a cylinder and a piston reciprocated therein, of a stationary heat-insulating plunger on the cylinder-head having air-supply channels, a cup-shaped heat-insulating lining on the piston having interior air-supply channels, an auxiliary piston at the lower end of the main-piston, a closed housing below the cylinder and auxiliary piston, air-admission valves located respectively in the housing and in said auxiliary piston, and means for conducting the air compressed in the housing into the cylinder and into and around the plunger and lining for cooling these parts and protecting them against the heat of the products of combustion.

12. In an internal-combustion engine, the combination, with a cylinder and a reciprocating piston in the same, of a stationary heat-insulating plunger on the cylinder-head having air-passages and a valved bore, a cup-shaped heat-insulating lining in the piston-head having air-passages, means for supplying a combustible fuel through said bore into the space between the plunger and lining, a closed housing below the cylinder and piston, an auxiliary piston at the lower end of the main-piston for compressing the air in said housing, a valved conduit for conducting the compressed air from the housing to the air-passages in the plunger, a valved channel in the piston for conducting compressed air through the air-passages into the cylinder for cooling the parts, an exhaust-chamber on the cylinder-head, an exhaust-valve in said cylinder-head, and an exhaust-pipe for permitting the escape of the products of combustion from the exhaust-chamber into the atmosphere.

In witness whereof I have hereunto set my hand in presence of two witnesses.

HUGO HADWIGER.

Witnesses:
 ALVESTO S. HOGUE,
 AUGUST FUGGER.